July 30, 1946.  E. O. MUELLER ET AL  2,404,979
SPLASHPROOF TRACTION MOTOR
Filed Jan. 29, 1943  3 Sheets-Sheet 1

WITNESSES:
E. A. McCloskey
F. P. Lyle

INVENTORS
Erich O. Mueller and
Richard H. Wagner.
BY O. B. Buchanan
ATTORNEY

WITNESSES:
E. A. McCloskey
F. P. Lyle

INVENTORS
Erich O. Mueller and
Richard H. Wagner.
BY O. B. Buchanan
ATTORNEY

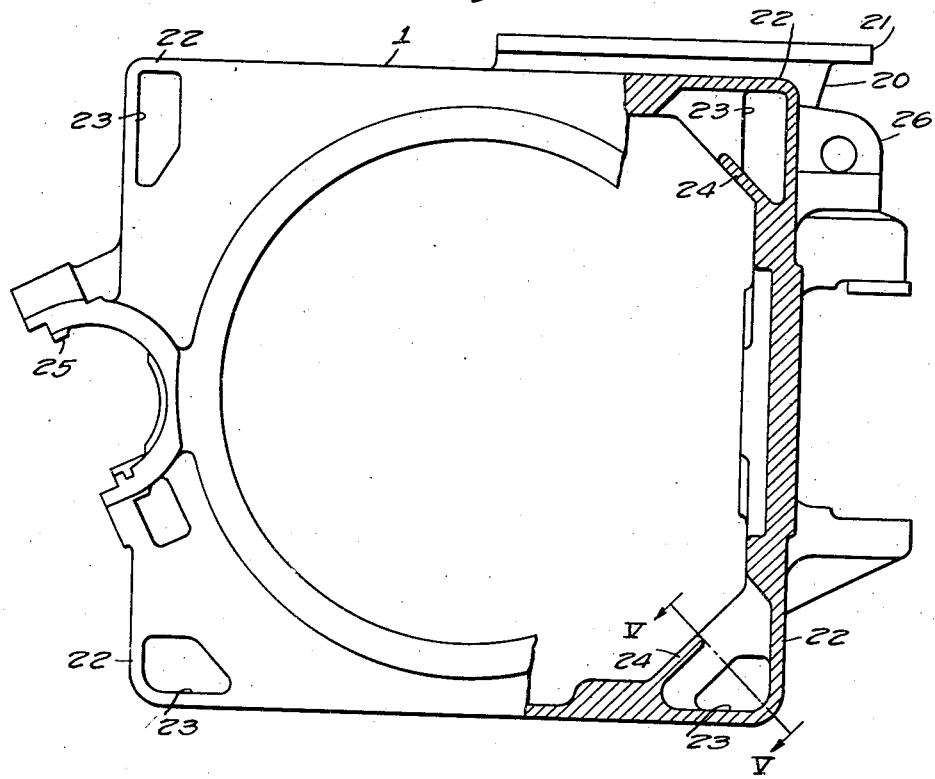
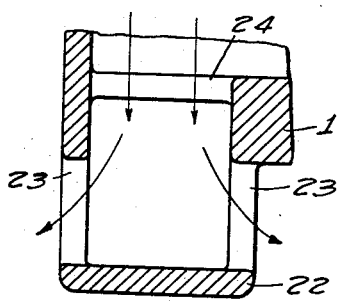

Patented July 30, 1946

2,404,979

UNITED STATES PATENT OFFICE 2,404,979

SPLASHPROOF TRACTION MOTOR

Erich O. Mueller, Irwin, and Richard H. Wagner, Edgewood, Pa., assignors to Westinghouse Electric Corporation, East Pittsburgh, Pa., a corporation of Pennsylvania Application January 29, 1943, Serial No. 473,916

4 Claims. (Cl. 172—36)

The present invention relates to electric motors, and more particularly to splashproof traction motors for electric railway use.

The principal object of the invention is to provide an electric motor which is designed to prevent the entrance of splashing water, or other foreign substances, through the ventilating openings, without materially restricting the free flow of ventilating air.

More specifically, it is an object of the invention to provide an electric traction motor for electric railway use in which the openings through which the ventilating air is discharged are located in air chambers which are arranged to prevent the entrance of splashing water into the motor without seriously obstructing the flow of the air. Railway motors are usually mounted directly on the trucks of the car or locomotive which they drive, and are therefore more or less exposed to weather conditions. Such motors are usually substantially completely enclosed, but provision must be made for the discharge of the ventilating air which flows through the motor, and the outlets for this air provide openings through which water may sometimes splash into the interior of the motor, as during a heavy rain. The present invention provides a construction in which the air outlets are located in air chambers adjacent one end of the motor, which have means for preventing the entrance of splashing water into the motor, and which are arranged so that the openings are disposed in vertical planes parallel to the direction of movement of the motor, so that danger of water splashing into the openings is minimized.

Other objects and advantages of the invention will be apparent from the following detailed description, taken in connection with the accompanying drawings, in which:

Fig. 4 is an end elevation of the motor frame, partly in section on the line IV—IV of Fig. 3, and Fig. 5 is a fragmentary sectional view on the line V—V of Fig. 4.

Figure 2:
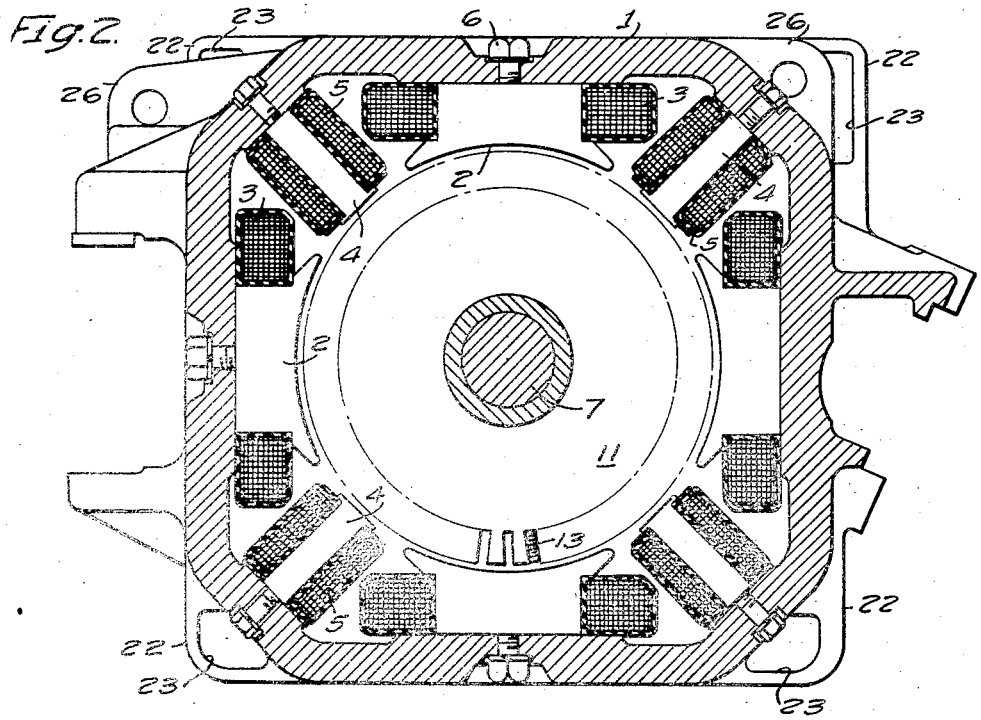
Fig. 2 is a transverse sectional view, approximately on the line II—II of Fig. 3.
Figure 3:
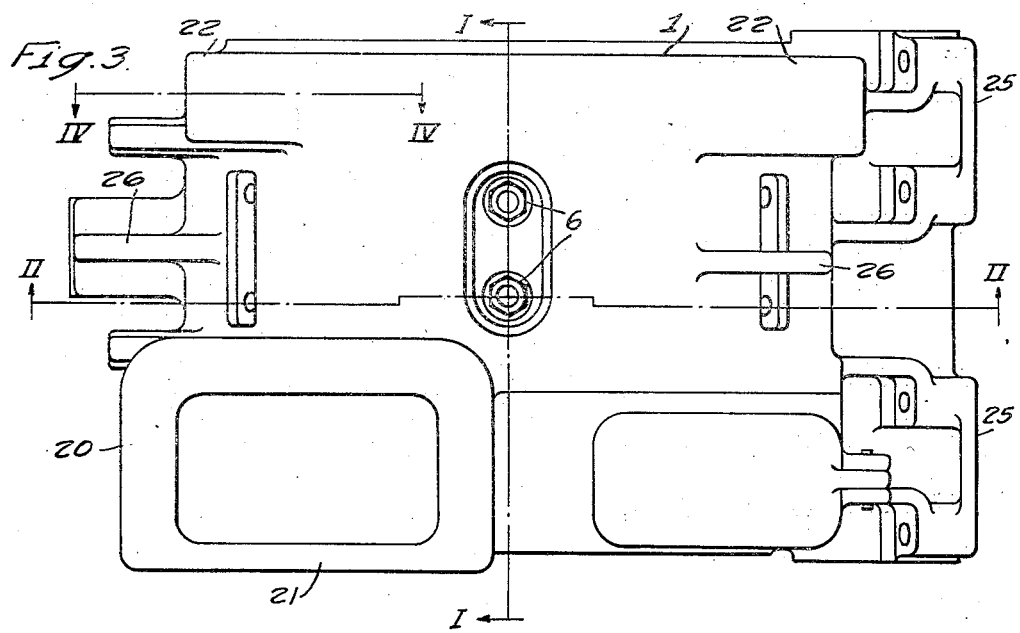
Fig. 3 is a top plan view of the motor.

The motor shown in the drawings for the purpose of illustration is a high-voltage, direct-current traction motor for electric railway use, but it will be understood that the invention may be applied equally well to other types of motors. The motor shown in the drawings has an enclosing frame 1, which may be either cast or fabricated, and which is generally octagonal in cross-section in its central portion, as shown in Fig. 2. Main pole pieces 2, on which are supported main field windings 3, and commutating poles 4 carrying commutating windings 5 are mounted on the interior of the central portion of the frame in any desired manner, as by mounting bolts 6.

The motor has a shaft 7 which is supported in roller bearings generally indicated at 8. The bearings 8 are mounted in end brackets 9 which completely enclose the ends of the motor, and which are secured in the frame 1 by bolts 10, or in any other suitable manner. The shaft 7 carries a laminated rotor core 11 which is provided with axial passages 12 for ventilating purposes, and which has slots in its peripheral surface in which an armature winding 13 of any suitable type is placed in the usual manner. The armature winding 13 is connected to a commutator 14 mounted on a commutator spider 15 which has axial passages 16 extending therethrough. The passages 16 communicate with an annular space 17 in the end plate 18 at the commutator end of the armature 11. The annular space 17 encloses the ends of the axial passages 12, so that air flowing through the passages 16 into the space 17 enters the passages 12 and flows through them to cool the armature. Axial passages 19 are also provided at the opposite end of the armature to permit the escape of the air flowing through the passages 12.

The frame 1, as previously mentioned, is generally octagonal in cross-section in its central portion. At the commutator end of the frame an air inlet 20 is provided at one side of the longitudinal central plane of the motor, through which air is forced into the motor for cooling purposes. The air inlet 20 may have a flange 21 to adapt it for connection to an air duct. The opposite, or pinion end of the frame 1 is made square in cross-section, as clearly seen in Figs. 2 and 4, so that the corners of the square end portion of the frame project radially beyond the adjacent surfaces of the octagonal central portion. These extending corners form air chambers 22 through which the ventilating air is discharged from the machine, and each of the air chambers 22 has an opening 23 in each of its side walls, so that there is a total of eight discharge openings through which the escaping air may flow.

In order to prevent water which may splash through the openings 23 from entering the interior of the motor, each of the air chambers 22 has a baffle wall 24 adjacent its openings 23 and extending past the openings in such a manner that any water which may enter through the openings 23 will strike the baffle wall 24 and be deflected towards the bottom of the chamber 22. As clearly shown in Fig. 4, the openings 23 extend to the bottom surfaces of the chambers 22 so that any water which strikes the baffles 24 and is deflected down to the bottom of the chamber will drain out through the openings 23.

The frame I has axle bearing seats 25 and suspension lugs 26 for mounting it in position on the truck of a railway locomotive or car. The motor is intended to be suspended on the truck by the lugs 26 and supported on an axle by means of the bearing seats 25, with the shaft extending transversely of the truck and geared to the axle. It will be apparent that in this position the openings 23 are located in vertical planes which are parallel to the direction of motion of the motor. This position of the openings minimizes the danger of any great amount of water splashing into them, even during a heavy rain, since water splashing on the ground adjacent the motor while it is moving would tend to strike either the front or rear of the motor.

Figure 1:
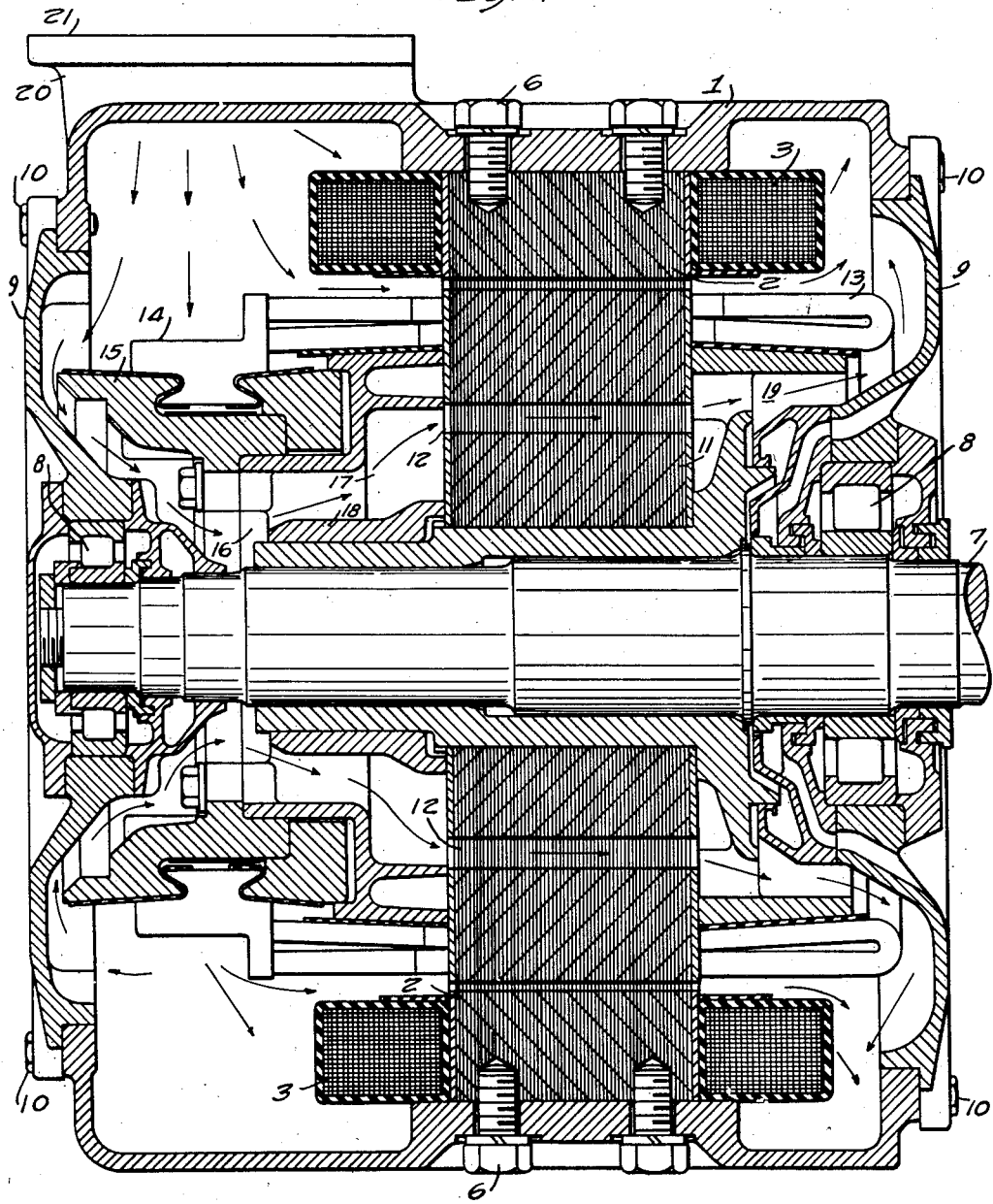
Figure 1 is a longitudinal sectional view of a motor embodying the invention.

The motor is ventilated by air entering through the air inlet 20, which is preferably connected to a duct through which air is forced by a blower on the locomotive to provide forced ventilation for the motor. The air entering through the inlet 20 passes through the motor as shown by the arrows in Figs. 1 and 5, some of the air flowing directly over the poles 2 and 4, and field windings 3 and 5, while some of it passes over the commutator to cool the commutator and the brushes and brush rigging, which are mounted on the frame adjacent the commutator. This air then flows through the passages in the commutator spider and end plate 18 into the axial passages 12 through the armature, from which it is discharged through the passages 19. Thus, the air flows through the motor by different paths from the commutator end to the opposite, or pinion, end where the air chambers 22 are located, and all the air flows into these chambers and escapes from the motor through the openings 23. The provision of two relatively large openings in each of the air chambers 22 permits the air to escape without any restriction on its flow due to the discharge openings, while the baffles are arranged so that they do not materially obstruct the flow of air. Thus the effectiveness of the ventilation of the machine is not adversely affected by the splashproof construction. This is an important advantage, since prior splashproof constructions have usually seriously restricted or obstructed the flow of air, with resultant impairment of the ventilation.

It should now be apparent that a splashproof construction especially adapted for electric railway motors has been provided which effectively prevents the entrance of splashing water or other foreign substances into the interior of the motor, but which does not materially impair the effectiveness of ventilation. It will be apparent that the invention can be applied to motors differing in their detailed construction from that shown, and that various modifications might be made within the scope of the invention. It is to be understood, therefore, that the invention is not limited to the exact details of construction shown and described but, in its broadest aspects, it includes all equivalent embodiments and modifications which come within the scope of the appended claims.

We claim as our invention:

1. A dynamo-electric machine having a rotor member and a stator member, said stator member including a frame structure, the frame structure being generally octagonal in cross-section, but having an end portion which is generally square in cross-section, whereby the corners of said end portion form chambers extending radially beyond the adjacent surfaces of the octagonal portion of the frame structure, said chambers having openings in their side walls to permit the escape of ventilating air, and means in said chambers for preventing the entrance of liquid into the interior of the machine through the chambers.

2. A dynamo-electric machine having a rotor member and a stator member, said stator member including a frame structure, the frame structure being generally octagonal in cross-section, but having an end portion which is generally square in cross-section, whereby the corners of said end portion form chambers extending radially beyond the adjacent surfaces of the octagonal portion of the frame structure, said chambers having openings in their side walls to permit the escape of ventilating air, and baffle walls in said chambers disposed adjacent the openings to catch liquid entering the chambers through said openings.

3. A dynamo-electric machine having a rotor member and a stator member, said stator member including a frame structure and end brackets closing the ends of the frame structure, air inlet means adjacent one end of the frame structure, said frame structure having a central portion and having an integral end portion at the opposite end from said air inlet means, said end portion being generally square in cross-section, whereby the corners of the square end portion form chambers extending radially beyond the adjacent surfaces of the central portion of the frame structure, said chambers having openings in their side walls for the escape of ventilating air, and baffle walls in said chambers for preventing the entrance of liquid into the machine.

4. A dynamo-electric machine having a rotor member and a stator member, said stator member including a frame structure and end brackets closing the ends of the frame structure, air inlet means adjacent one end of the frame structure, said frame structure having a central portion and having an integral end portion at the opposite end from said air inlet means, said end portion being generally square in cross-section, whereby the corners of the square end portion form chambers extending radially beyond the adjacent surfaces of the central portion of the frame structure, said chambers having openings therein in planes transverse to the axis of the machine for the escape of ventilating air, and baffle walls in said chambers for preventing the entrance of liquid into the machine.

ERICH O. MUELLER.
RICHARD H. WAGNER.